(12) United States Patent
Selnes et al.

(10) Patent No.: US 8,321,054 B2
(45) Date of Patent: Nov. 27, 2012

(54) INDUSTRIAL ROBOT AND A METHOD FOR ADJUSTING A ROBOT PROGRAM

(75) Inventors: Tony Selnes, Vasteras (SE); Ake Olofsson, Vasteras (SE)

(73) Assignee: ABB Technology Ltd. (CH)

( * ) Notice: Subject to any disclaimer, the term of this patent is extended or adjusted under 35 U.S.C. 154(b) by 0 days.

(21) Appl. No.: 13/396,335

(22) Filed: Feb. 14, 2012

(65) Prior Publication Data

US 2012/0143371 A1    Jun. 7, 2012

Related U.S. Application Data

(63) Continuation of application No. PCT/EP2009/060548, filed on Aug. 14, 2009.

(51) Int. Cl.
*G05B 19/18* (2006.01)
*G05B 15/00* (2006.01)
*G05B 19/00* (2006.01)

(52) U.S. Cl. ........ 700/254; 700/253; 700/257; 700/258; 700/264; 901/3; 901/31; 901/42; 901/45

(58) Field of Classification Search .......... None
See application file for complete search history.

(56) References Cited

U.S. PATENT DOCUMENTS

| | | | |
|---|---|---|---|
| 4,737,697 A | | 4/1988 | Maruo et al. |
| 5,341,459 A | * | 8/1994 | Backes ............ 700/260 |
| 5,509,847 A | * | 4/1996 | Jinno et al. ......... 451/11 |
| 5,994,864 A | * | 11/1999 | Inoue et al. ........ 318/568.2 |
| 6,193,142 B1 | | 2/2001 | Segawa et al. |
| 6,212,443 B1 | | 4/2001 | Nagata et al. |
| 6,377,011 B1 | * | 4/2002 | Ben-Ur ............ 318/566 |
| 6,877,215 B2 | * | 4/2005 | Pfeiffer ............ 29/729 |
| 7,373,219 B2 | * | 5/2008 | Nowlin et al. ........ 700/245 |
| 7,386,365 B2 | * | 6/2008 | Nixon ............ 700/245 |
| 7,738,996 B2 | * | 6/2010 | Luthardt ........... 700/245 |
| 7,778,733 B2 | * | 8/2010 | Nowlin et al. ........ 700/260 |
| 7,872,436 B2 | * | 1/2011 | Kock et al. .......... 318/631 |
| 2008/0071291 A1 | * | 3/2008 | Duval et al. ......... 606/130 |
| 2008/0312769 A1 | * | 12/2008 | Sato et al. .......... 700/249 |

FOREIGN PATENT DOCUMENTS

WO    2005075157 A1    8/2005

OTHER PUBLICATIONS

International Preliminary Report on Patentability; Application No. PCT/EP2009/060548; Issued: Oct. 24, 2011; 14 pages.

(Continued)

*Primary Examiner* — Khoi Tran
*Assistant Examiner* — Bao Long T Nguyen
(74) *Attorney, Agent, or Firm* — St. Onge Steward Johnston & Reens LLC

(57) ABSTRACT

A method for adjusting a program including program instructions for controlling an industrial robot to carry out work at a plurality of target points on a work object. The robot includes a tool having two arms adapted to clamp the work object and at least one of the arms is arranged movable relative the other arm in an opening and a closing direction, a manipulator adapted to hold the tool or the work object, and a controller controlling the movements of the manipulator and the tool arm and configured to switch between a normal control mode and a compliant control mode in which the manipulator has a reduced stiffness in at least one direction. The method includes moving the manipulator and the tool according to the program instructions until one of the target points is reached.

14 Claims, 2 Drawing Sheets

OTHER PUBLICATIONS

International Search Report & Written Opinion of the International Searching Authority; Application No. PCT/EP2009/060548; Issued: Sep. 29, 2009; Mailing Date: Oct. 26, 2009; 11 pages.

Written Opinion of the International Preliminary Examining Authority; Application No. PCT/EP2009/060548; Mailing Date: Aug. 11, 2011; 5 pages.

* cited by examiner

INDUSTRIAL ROBOT AND A METHOD FOR ADJUSTING A ROBOT PROGRAM

CROSS-REFERENCE TO RELATED APPLICATIONS

The present application is a continuation of pending International Patent Application PCT/EP2009/060548 filed on Aug. 14, 2009 which designates the United States, and the content of which is incorporated herein by reference.

FIELD OF THE INVENTION

The present invention relates to a method for adjusting a program including program instructions for controlling an industrial robot to carry out work at a plurality of target points on a work object. The present invention further relates to an industrial robot comprising a tool having two arms adapted to clamp the work object and at least one of the arms is arranged movable relative the other arm in an opening and a closing direction, a manipulator adapted to hold the tool or the work object, and a controller controlling the movements of the manipulator and the movements of the tool arm and configured to switch between a normal control mode and a compliant control mode in which the manipulator has a reduced stiffness in at least one direction.

The invention is useful for programming robot applications using a tool for clamping a work object, such as spot welding and gripping.

The present invention further relates to the use of the method according to the invention for programming a welding application.

BACKGROUND OF THE INVENTION

During normal operation of an industrial robot, the robot is stiff in all directions and orientations. A problem with operating such a robot is that it has no ability to absorb a strong force applied from the outside. For example, in a case when the robot aims to work in operations to receive a force applied from an external machine. In order to overcome this problem many robots have been provided with the possibility to switch the robot into a compliance control mode. In the compliance control mode the gains of the position loop and the speed loop are significantly reduced such that the stiffness of the manipulator is reduced. This allows the robot to effectively perform like a mechanical spring when encountering resistance during operation, thereby enabling the robot to deviate from the programmed path and thus cope with tolerances in fixtures and tools.

U.S. Pat. No. 5,994,864 discloses an industrial robot including a robot controller which performs operations while switching between position control and compliance control. When the robot is switched to the position control the gain of the position loop and the speed loop is set at a large value in order to make the manipulator stiff. When the robot controller is set to the compliance control, the position gain and the speed gain are lowered in accordance with the degree of setting flexibility. When the robot controller is switched to the compliance control the manipulator will act like a spring when colliding with an obstacle, which means that the manipulator, after it has been moved due to the collision, will strive to move back to it original position.

There also exist a variant of the compliance control in which the manipulator is compliant, but does not act like a spring. With this function it is possible to make the robot with its tool "floating" in any arbitrary direction in the Cartesian space. When the robot has been moved, for example, due to a collision with another moving object, the manipulator will stay in its new position and will not strive to move back to its original position. Different manufactures have different names for compliance control mode, such as soft float, soft move, soft servo, soft absorber, and servo float. A typical use is tending die-cast or injection moulding machines, where the robot is pushed out by the machine as the part is ejected, enabling the robot to follow the machine and thus reducing cycle time. Further examples are placing/picking a workpiece in a tool, placing a molded or cast part in a fixture, and tool exchanging on peripheral machines. The switching to the compliance control is made in the robot program.

Industrial robots are highly flexible devices used in many different industrial applications. A robot program includes a sequence of program instructions where each instruction tells the robot controller what to do and how to do it. Robots are programmed to follow a path including a plurality of target points. The robot program includes the positions of the target points. The programming of robots is a time consuming process and the conventional methods of using the robot during the programming and teaching process ties up the production equipment and delays production start. In order to save time and speed production start, it is highly desirable to program a robot off-line. When the off-line programming is completed, the program can be transferred to the real robot.

However, a robot program prepared by an off-line programming system cannot directly be used for operating a robot in a real robot cell, because the positional relationship between the robot and the work object in the off-line environment may deviate from the actual positional relationship between the robot and the object in the real robot cell. Accordingly, positions of the off-line programmed target points have to be adjusted before using the program. Today, adjustment of a target point is done by moving the manipulator to the next programmed target point in accordance with the instructions in the robot program and then to manually jog the manipulator so that the tool comes into contact with the work object at the target point. The position of the manipulator and the tool is stored, and the program instructions for the movements of the manipulator and the tool at the target point are adjusted based on the stored positions for the manipulator and the tool. This procedure is repeated for each target point on the work object. A disadvantage with the adjustment of the positions of the target points is that it is time consuming.

SUMMARY OF THE INVENTION

The object of the present invention is to speed up the adjustment of the positions of the target points.

According to one aspect of the invention this object is achieved by the method for adjusting a program including program instructions for controlling an industrial robot to carry out work at a plurality of target points on a work object.

The method comprises moving the manipulator and the tool according to the program instructions until one of the target points to be adjusted is reached, switching the controller to a compliant control mode so that the manipulator has a reduced stiffness in said opening and closing direction of the tool, moving the tool arm in the closing direction until the work object is clamped between the tool arms, by that moving the manipulator to the correct position in relation to the work object, and storing the positions of the axes of the manipulator and the position of the tool, and based thereon adjusting the program instructions for the movements of the manipulator and the tool at the target point.

As the robot is in compliant mode, the manipulator is automatically moved to the correct position in relation to the work object when the tool is closed and the work object is clamped between the arms of the tool. It is possible to automatically carry out all of the steps in the method for each target point. This method is automatic and thereby the time for carrying out the adjustment of the program is significantly reduced.

It is to be understood that some of the steps can be carried out in different order. For example, the switching to the compliant control mode can be made before moving the manipulator and the tool to the target point to be adjusted. In that case it is only necessary to switch to the compliant control mode once, and to switch back to the normal control mode when all target points in the program has been adjusted.

The method according to the invention can be used in the case when the manipulator carries the tool and the work object is fixed in the room, as well as in the case when the manipulator carries the work object and the tool is fixed in the room.

The method according to the invention can be used to adjust any program including target points no matter how it was programmed, for example, the program may have been programmed off-line or by manually teaching the robot.

When the robot is in the normal control mode, the manipulator is stiff in all directions and orientations, and when the robot is in compliant control mode the stiffness of the manipulator is reduced in at least one Cartesian direction. By Cartesian directions of the manipulator are meant linear directions in a linear coordinate system defined with respect to the manipulator, for example, a tool coordinate system or a work object coordinate system.

According to an embodiment of the invention, the method further comprises switching the controller to the normal control mode, moving the tool arm in the opening direction to a work position at a distance from the work object, and repeating the adjustment steps for the next target point. In order to adjust all the target points the method should be repeated for all the target points on the programmed path.

The tool is, for example, a welding gun and each of the arms is provided with a weld electrode.

The tool arm is moved in the closing direction until it is detected that the tool is clamping the work object. Thus, in order to know when to stop the closing movements of the tool, it is necessary to detect the moment when the tool clamps the work object. According to one embodiment of the invention, each arm is provided with a tip, and the method comprises determining the distance between the tips when the tool arm is moved in the closing direction, and stopping the movement of the arm when the distance between the tips are equal to or slightly less than the thickness of the work object at the target point. According to this embodiment of the invention, the distance between the tips of the tool arms is supervised and the clamping of the work object is detected when the distance between the tool arms is equal to or slightly less than the thickness of the work object.

An advantage with this embodiment is that no additional measuring equipment is necessary.

According to another embodiment of the invention, the force on at least one of the tool arms is measured and the moment when the work object is clamped between the tool arms is detected based on the measured force.

According to a further aspect of the invention, the object is achieved by a computer program product directly loadable into the internal memory of a computer or a processor, comprising software code portions for performing the steps of the method according to the appended set of method claims, when the program is run on a computer. The computer program is provided either on a computer-readable medium or through a network, such as the Internet.

According to another aspect of the invention, the object is achieved by a computer readable medium having a program recorded thereon, when the program is to make a computer perform the steps of the method according to the method for controlling an industrial robot, and the program is run on the computer.

According to another aspect of the invention this object is achieved by an industrial robot.

The robot comprises means for manually stepping through the program and running the instructions in the program one by one thereby causing the manipulator and the tool to move according to the program instructions, and a target adjusting module for automatically adjusting the positions of the targets points and the target adjusting module is configured to upon activation switch the controller to the compliant control mode so that the manipulator has a reduced stiffness in said opening and closing direction of the tool, to move the tool arm in the closing direction until the work object is clamped between the tool arms, by that moving the manipulator to the correct position in relation to the work object, and to store the positions of the axes of the manipulator and the position of the tool, and based thereon adjust the program instructions for the movements of the manipulator and the tool.

According to an embodiment of the invention, the robot comprises a portable operator control device for teaching and manually operating the robot, and the portable operator control device is configured to manually step through the program and to run the instructions in the program one by one, and the operator control device is provided with activation means which upon activation of a user starts execution of the target adjusting module. This embodiment makes it possible for the robot programmer to step through the control program, to run the program instructions including a target points and to have the target point automatically adjusted by means of the portable operator control device. When the programmer wants to adjust a target point, the only thing the programmer has to do is to activate the target adjusting module, which can be done from the operator control device which the programmer already has in his hands.

The invention will now be explained more closely by the description of different embodiments of the invention and with reference to the appended figures.

DETAILED DESCRIPTION OF THE INVENTION

Figure 1:
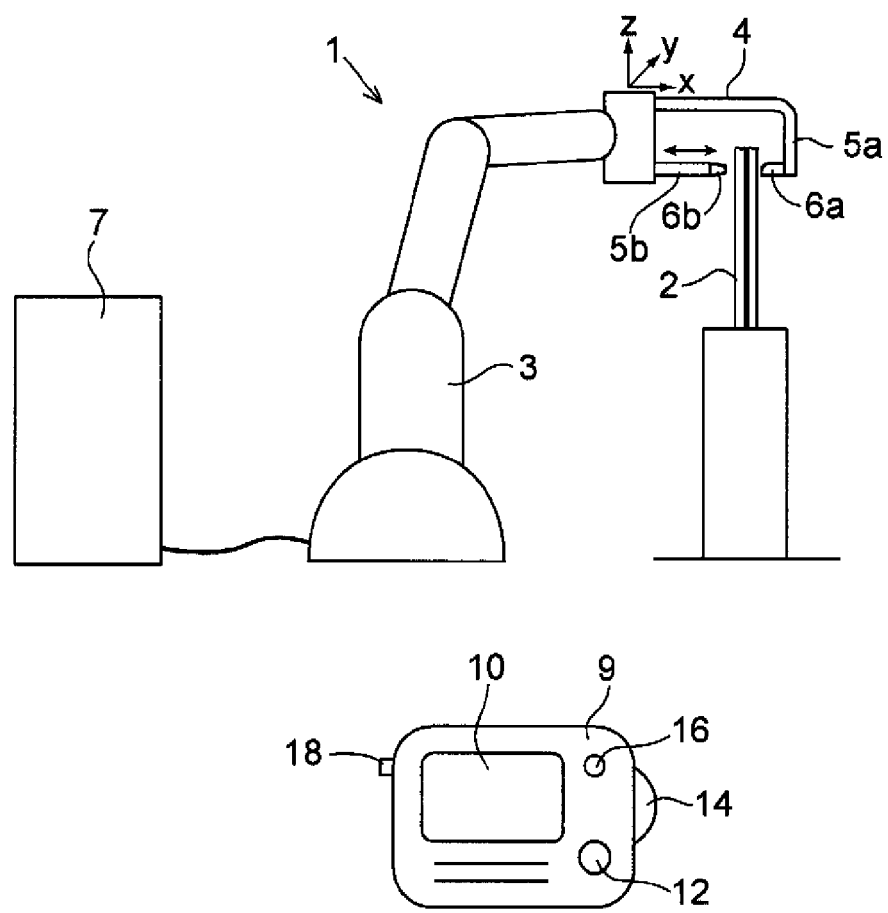
FIG. 1 shows a robot system according to an embodiment of the invention.

FIG. 1 shows a robot cell including an industrial robot 1 and a work object 2. In this example, the work object is two metal sheets which are to be welded together by means of spot welding. The work object is fixedly arranged in a fixture in the robot cell. The robot includes a manipulator 3 movable about a plurality of axes, a tool 4 having two arms 5a-b adapted to clamp the work object 2, and a robot controller 7 controlling the movements of the axes of the manipulator 3 and the movements of the tool 4. The robot controller 7 is configured to switch between a normal control mode and a compliant control mode in which the manipulator has a reduced stiffness in at least one of the axes of the manipulator or in at least one Cartesian direction. The normal control mode is the default mode used during normal operation of the robot. For some robots, it is possible for a user to select in which axes and Cartesian directions the manipulator shall be stiff and in which axes, tool directions and/or orientations the manipulator shall be resilient when the robot is in the resilient control mode. The robot controller 7 includes traditional hardware such as a central processing unit (CPU), internal memory, and means for communication with the manipulator and the Teach Pendant unit. In this example, the manipulator 1 has three main axes and three wrist axes.

In this embodiment, the tool 4 is a spot welding gun and the outer end of each of the arms is provided with a welding electrode 6a-b. In this embodiment, the arm 5a is fixedly arranged and the arm 5b is arranged movable relative to the fixed arm. The movable arm 5b is arranged movable between an opened and a closed position. In the closed position the tool 4 clamps the work object 2 between the arm, and in the opened position the distance between the arms are such that it is possible to insert the work object in the opening between the arms and to remove the work object from the tool. A tool coordinate system x,y,z is defined in relation to the tool. The tool is opened and closed in this example in the x-direction of the tool coordinate system.

The robot further comprises a portable operator control device 9, generally denoted a teach pendant unit (TPU). The TPU includes hardware such as a central processing unit (CPU), internal memory, and means for communication with the controller. A robot operator uses the TPU for manually controlling the robot, for example to jog the robot. The TPU may also be used for monitoring robot program, changing certain variables in the program, starting, stopping and editing the program. The TPU comprises a display screen 10. The TPU is communicating with the control unit 7 and is connected to the robot controller 7 either via a cable or wireless. The Teach Pendant unit 9 is also provided with means 12, such as a joy stick or jogging buttons, for manually moving the manipulator 1, and safety equipment for protecting a user against injury during manual control of the robot, such as an enabling device 14 and an emergency stop button 16. The Teach Pendant unit 9 comprises user input means for entering data to the Teach Pendant unit. The display screen 10 is, for example, a touch screen, which makes it possible for the user to interact with the Teach Pendant unit via the screen.

The manipulator 1 is programmed to perform work in connection with the work object 6. In this case the manipulator is programmed to move the tool 4 along a predetermined welding path on the work object and to stop the tool at predetermined welding positions on the path. The programmed welding positions are stored as target points on the path. One or more control programs include instructions for the movements of the manipulator and the tool. The Teach Pendant unit 9 is provided with means for manually stepping through the control programs and running the instructions in the program one by one thereby causing the manipulator and the tool to move according to the program instructions. Sometimes the robot is programmed at an off-line site by means of an off-line programming tool. Output from the programming tool is control programs including a plurality of target points.

The robot controller 7 is provided with servo controllers for controlling the positions of the motors driving the motion of the manipulator. The servo controller comprises a position controller including a position control loop configured to calculate speed references based on a position error, which is calculated as the difference between position references from a main computer of the robot and measured positions from a position sensor. The position error is multiplied by a constant denoted the position gain. The strength of the position control depends on the value of the position control gain. The servo controller further comprises a speed controller including a speed control loop configured to calculate a speed error based on the difference between the speed references from the position controller and speed measurements, and further to calculate torque references for the motor based on the speed error multiplied by a constant denoted the speed control gain. The strength of the speed control depends on the value of the speed control gain. During normal control mode of the robot controller, the gain of the position loop and the speed loop are set at a high value such that the robot is stiff in all directions and orientations. When the controller is switched to the resilient control mode, the gains of the position loop and the speed loop are significantly reduced such that the stiffness of the manipulator is reduced. The switching to the compliance control mode is made in the robot program.

The TPU is configured so that it is possible to step through the control program and run one program instruction at a time. When a program instruction including a target point is run, the robot moves the tool to the programmed target point. If the program has been programmed off-line with an off-line programming tool, it is necessary to adjust the positions of the programmed target points before running the control program in production. According to the invention, the robot is provided with a target adjusting module configured to upon activation automatically adjust the position of the present target point. The target adjusting module comprises software instructions for carrying out the adjustment of one target point. According to an embodiment of the invention, the target adjusting module is stored on the TPU and executed by the hardware of the TPU. Alternatively, the target adjusting module is stored on the robot controller 7 and executed by the hardware of the robot controller 7.

In this embodiment, the TPU is provided with activation means which upon activation of a user starts execution of the target adjusting module. Preferably, the activation means is provided on the TPU. The activation means is, for example, a physical push button 18 provided on the cover of the TPU, or a software generated element provided on the screen 10, such as a soft button, or an instruction on a tool bar. The target adjusting module is activated by the robot programmer, for example, by pushing the button 18 on the TPU. When the program module is activated, the position of the present target point is automatically adjusted. The target adjusting module is configured to upon activation switch the robot controller 7 to the compliant control mode so that the manipulator has a reduced stiffness at least in the opening and closing direction of the tool, to move the tool arm in the closing direction until the work object is clamped between the tool arms, and to store the positions of the axes of the manipulator and the position of the tool when the work object is clamped between the tool arms, and based on the stored positions determine a new position of the target point and accordingly amending the program instructions for the movements of the manipulator and the tool.

Figure 2A:
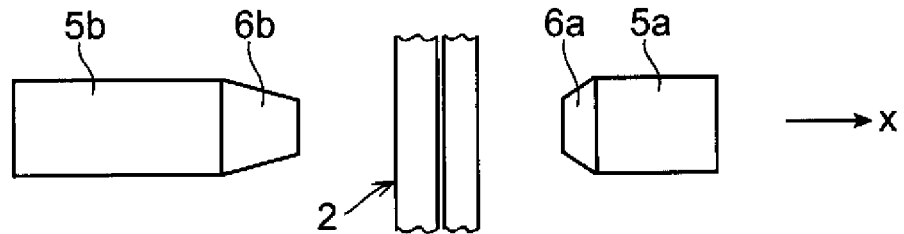
FIGS. 2a-2d show examples of the movements of a tool when target points of a robot program are adjusted with a method according to the invention.

A method for adjusting a program according to an embodiment of the invention will now be explained with reference to the FIGS. 2a-2d. FIG. 2a shows the arms 5a-b with the welding electrodes at a distance from the work object 2. The work object is arranged in a fixed position relative the robot base coordinate system. In a first step the robot is moved to the position P1 that needs to be modified. This is done by running the program instruction with the target point. For, example, the robot programmer, which holds the TPU in his hands, steps through the control program and executes the instructions until the instruction with the first target point is reached.

Figure 2B:
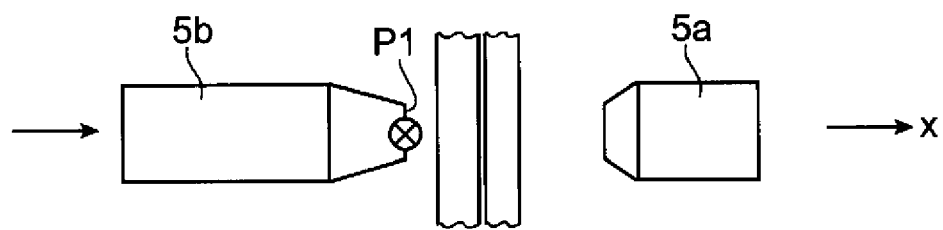

The programmer order execution of the instruction with the first target point and the robot moves to the programmed position P1 of the target point. As seen in FIG. 2b, the programmed position of the target point is reached. The robot controller 7 is switched to the compliant control mode so that the manipulator has a reduced stiffness at least in the opening and closing direction of the tool, in this example in the x-direction of the tool coordinate system. The target adjusting module contains a program instruction ordering the switching to the compliant control mode.

Figure 2C:
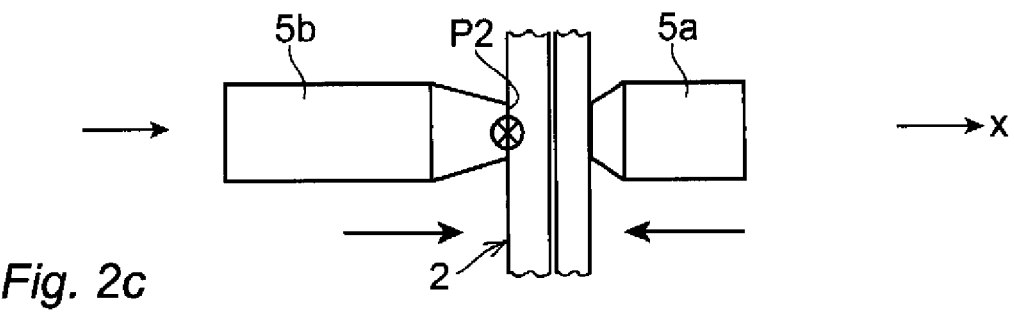
Figure 2D:
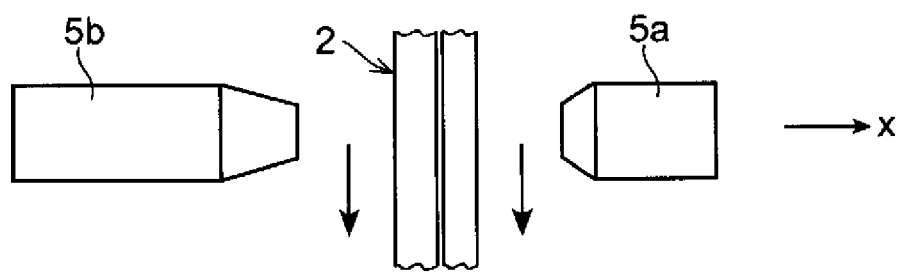

When the controller has switched to the compliant control mode the movable tool arm 5b is moved in the closing direction until the work object is tightly clamped between the two electrodes 6a-b. As the robot is compliant the manipulator follows the movements of the tool, and accordingly the robot is moved into the correct position P2, as seen in FIG. 2c. The tool arm 5b moves the manipulator to the new position P2 during the closing movement of the tool as the manipulator is soft in the x-direction. To be able to determine when to stop the closing movement of the tool the distance between the tips of the electrodes is determined when the tool arm is moved in the closing direction. The tool arm is moved in the closing direction until it is detected that the distance between the tips of the arms are equal to or slightly less than the thickness of the work object at the target point. Alternatively, the force on at least one of the tool arms is measured and it is detected when the work object is clamped between the tool arms based on the measured force. When the force is larger than a limit value it is detected that the work object is clamped between the tool arms. For example, one of the tool arms is provided with a sensor for measuring the force on the arm. The sensor can be mounted on one or both of the electrodes. Alternatively, the sensor can be mounted on one or both of the arms in order to measure the strain of the arms when a force is applied. The sensor is, for example, a strain gauge.

The positions of the axes of the manipulator and the tool are stored and the position of the target in the program is modified accordingly. The program is stopped. The new position of the target point is, for example, stored when the programmer presses a control button on the TPU, which control button is configured to store the present position of the robot and the tool upon activation. Alternatively, the new position of the target point is automatically stored when the distance between the arms is about the same as the width of the work object. The robot controller is switched back to the normal control mode. Thereafter, the program is started and the tool is opened to a predefined work stroke position and the robot moves to the next weld position, FIG. 2d. The previous steps are repeated for all target points in the control program that have to be modified. It is also possible to keep the controller in the compliant mode until all target points have been modified and switch the controller to normal control mode when the adjustment of the control program has been finished.

The present invention is not limited to the embodiments disclosed but may be varied and modified within the scope of the following claims. For example, the manipulator can be adapted to hold the work object instead of the tool. In that case the work object is arranged fixed in the robot cell. The invention is not limited to welding applications. The invention is useful for adjusting all control programs independent of how the program was generated. Thus, the method can be used for adjusting off-line as well as on-line generated programs.

What is claimed is:

1. A method for adjusting a program including program instructions for controlling an industrial robot to carry out work at a plurality of target points on a work object, the robot comprising:
    a tool having two tool arms adapted to clamp the work object and at least one of the tool arms is arranged movable relative the other tool arm in an opening and a closing direction,
    a manipulator movable about a plurality of axes and adapted to hold the tool or the work object, and
    a controller controlling movements of the manipulator and movements of the at least one of the tool arms and configured to switch between a normal control mode and a compliant control mode in which the manipulator has a reduced stiffness in at least one Cartesian direction,
characterized in that the method comprises:
    moving the manipulator and the tool according to the program instructions until one of the target points is reached,
    switching the controller to the compliant control mode so that the manipulator has a reduced stiffness in said opening and closing direction of the tool,
    moving the at least one of the tool arms in the closing direction until the work object is clamped between the tool arms, by that moving the manipulator to a correct position in relation to the work object, and
    storing positions of the axes of the manipulator and a position of the tool when the work object is clamped between the tool arms, and adjusting the program instructions for the movements of the manipulator and the tool at the target point based on the stored positions of the axes of the manipulator and the stored position of the tool.

2. The method according to claim 1, wherein the method further comprises:
    switching the controller to the normal control mode,
    moving the at least one of the tool arms in the opening direction to a work position at a distance from the work object, and
    repeating the steps of claim 1 for a next target point.

3. The method according to claim 1, wherein said tool is a welding gun and each of the tool arms is provided with a weld electrode.

4. The method according to claim 1, wherein each to arm is provided with a tip, and the method comprises determining a distance between the tips when the at least one of the tool arms is moved in the closing direction, and stopping the movement of the at least one of the tool arms when the distance between the tips are equal to or slightly less than a thickness of the work object at the target point.

5. The method according to claim 1, wherein the method further comprises measuring a force on at least one of the tool arms and detecting when the work object is clamped between the tool arms based on the measured force.

6. A computer program product directly loadable into the internal memory of a computer, comprising software for performing method for adjusting a program including program instructions for controlling an industrial robot to carry out work at a plurality of target points on a work object, the robot comprising:
    a tool having two to arms adapted to clamp the work object and at least one of the to arms is arranged movable relative the other tool arm in an opening and a closing direction,
    a manipulator movable about a plurality of axes and adapted to hold the tool or the work object, and a controller controlling movements of the manipulator and movements of the at least one of the tool arms and configured to switch between a normal control mode and a compliant control mode in which the manipulator has a reduced stiffness in at least one Cartesian direction, characterized in that the method comprises:

moving the manipulator and the tool according to the program instructions until one of the target points is reached, switching the controller to the compliant control mode so that the manipulator has a reduced stiffness in said opening and closing direction of the tool, moving the at least one of the tool arms in the closing direction until the work object is clamped between the tool arms, by that moving the manipulator to a correct position in relation to the work object, and storing positions of the axes of the manipulator and a position of the tool when the work object is clamped between the tool arms, and adjusting the program instructions for the movements of the manipulator and the tool at the target point based on the stored positions of the axes of the manipulator and the stored position of the tool.

7. A computer-readable medium, having a program recorded thereon, where the program is to make a computer perform, when said program is run on the computer, a method for adjusting a program including program instructions for controlling an industrial robot to carry out work at a plurality of target points on a work object, the robot comprising:

a tool having two to arms adapted to clamp the work object and at least one of the to arms is arranged movable relative the other tool arm in an opening and a closing direction, a manipulator movable about a plurality of axes and adapted to hold the tool or the work object, and a controller controlling movements of the manipulator and movements of the at least one of the tool arms and configured to switch between a normal control mode and a compliant control mode in which the manipulator has a reduced stiffness in at least one Cartesian direction, characterized in that the method comprises:

moving the manipulator and the tool according to the program instructions until one of the target points is reached, switching the controller to the compliant control mode so that the manipulator has a reduced stiffness in said opening and closing direction of the tool, moving the at least one of the tool arms in the closing direction until the work object is clamped between the tool arms, by that moving the manipulator to a correct position in relation to the work object, and storing positions of the axes of the manipulator and a position of the tool when the work object is clamped between the tool arms, and adjusting the program instructions for the movements of the manipulator and the tool at the target point based on the stored positions of the axes of the manipulator and the stored position of the tool.

8. A method for programming a welding application by adjusting a program including program instructions for controlling an industrial robot to carry out work at a plurality of target points on a work object, the robot comprising:

a tool having two to arms adapted to clamp the work object and at least one of the to arms is arranged movable relative the other tool arm in an opening and a closing direction, a manipulator movable about a plurality of axes and adapted to hold the tool or the work object, and a controller controlling movements of the manipulator and movements of the at least one of the tool arms and configured to switch between a normal control mode and a compliant control mode in which the manipulator has a reduced stiffness in at least one Cartesian direction, characterized in that the method comprises:

moving the manipulator and the tool according to the program instructions until one of the target points is reached, switching the controller to the compliant control mode so that the manipulator has a reduced stiffness in said opening and closing direction of the tool, moving the at least one of the tool arm in the closing direction until the work object is clamped between the tool arms, by that moving the manipulator to a correct position in relation to the work object, and storing positions of the axes of the manipulator and a position of the tool when the work object is clamped between the tool arms, and adjusting the program instructions for the movements of the manipulator and the tool at the target point based on the stored positions of the axes of the manipulator and the stored position of the tool.

9. An industrial robot comprising:

a tool having two to arms adapted to clamp a work object and at least one of the to arms is arranged movable relative the other tool arm in an opening and a closing direction, a manipulator movable about a plurality of axes and adapted to hold the tool or the work object, and a controller controlling movements of the manipulator and movements of the at least one of the tool arms and configured to switch between a normal control mode and a compliant control mode in which the manipulator has a reduced stiffness in at least one Cartesian direction, and the controller is configured to receive a program including program instructions for controlling the robot to carry out work at a plurality of target points on a work object, wherein the robot comprises means for manually stepping through the program and running the instructions in the program one by one thereby causing the manipulator and the tool to move according to the program instructions, characterized in that the robot further comprises a target adjusting module for automatically adjusting the positions of the targets points and the target adjusting module is configured to upon activation switch the controller to the compliant control mode so that the manipulator has a reduced stiffness in said opening and closing direction of the tool, to move the at least one of the tool arms in the closing direction until the work object is clamped between the tool arms, by that moving the manipulator to a correct position in relation to the work object, and to store positions of the axes of the manipulator and a position of the tool when the work object is clamped between the tool arms, and to adjust the program instructions for the movements of the manipulator and the tool based on the stored positions of the axes of the manipulator and the stored position of the tool.

10. The robot according to claim 9, wherein the target adjusting module is configured to switch the controller back to the normal control mode, and to move the at least one of the tool arms in the opening direction to a work position at a distance from the work object.

11. The robot according to claim 9, wherein said tool is a welding gun and each of tool arms is provided with a weld electrode.

12. The robot according to claim 9, wherein each to arm is provided with a tip, and the target adjusting module is configured to determine the distance between the tips when the at least one of the tool arms is moved in the closing direction, and to stop the movement of the at least one of the tool arms when the distance between the tips are equal to or slightly less than a thickness of the work object at the target point.

13. The robot according to claim 9, wherein at least one of the tool arms is provided with a sensor for measuring the force on the at least one of the tool arms and the target adjusting module is configured to detect when the work object is clamped between the tool arms based on the measured force.

14. The robot according to claim 9, wherein the robot comprises a portable operator control device for teaching and manually operating the robot, and the portable operator control device is configured to manually step through the program and to run the instructions in the program one by one, and the portable operator control device is provided with activation means which upon activation of a user starts execution of the target adjusting module.

* * * * *